(12) United States Patent
Larner et al.

(10) Patent No.: US 9,849,852 B1
(45) Date of Patent: Dec. 26, 2017

(54) INTELLIGENT DEPLOYMENT OF SAFETY MECHANISMS FOR AUTONOMOUS VEHICLES

(71) Applicant: Waymo, LLC, Mountain View, CA (US)

(72) Inventors: Daniel Lynn Larner, San Jose, CA (US); Atul Gupta, San Jose, CA (US); Felix Jose Alvarez Rivera, Tarzana, CA (US); Thomas Daniel, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 14/845,548

(22) Filed: Sep. 4, 2015

(51) Int. Cl.
  *B60R 22/00* (2006.01)
  *E05F 15/00* (2015.01)
  (Continued)

(52) U.S. Cl.
  CPC ... *B60R 21/0134* (2013.01); *B60R 2021/01013* (2013.01); *B60R 2021/01204* (2013.01); *B60R 2021/01286* (2013.01)

(58) Field of Classification Search
  CPC .... B60R 2001/1215; B60R 2001/1253; B60R 2011/0075; B60R 2021/0027;
  (Continued)

(56) References Cited

U.S. PATENT DOCUMENTS 5,377,108 A * 12/1994 Nishio ............... B60R 21/0132
  180/282
5,430,649 A * 7/1995 Cashler ............. B60R 21/0132
  180/274
(Continued)

FOREIGN PATENT DOCUMENTS

DE    102010019592 A1    11/2011

OTHER PUBLICATIONS

Predictive Mover Detection and Tracking in Cluttered Environments, 9 pgs. (2006).
(Continued)

*Primary Examiner* — Jelani Smith
*Assistant Examiner* — Luis A Martinez Borrero
(74) *Attorney, Agent, or Firm* — Lerner, David, Littenberg, Krumholz & Mentlik, LLP

(57) ABSTRACT

Aspects of the disclosure relate to deploying safety mechanisms in an autonomous vehicle. As an example, the situational information identifying a potential impact target corresponding to an object with which the autonomous vehicle is predicted to have a collision within a predetermined period of time may be received. This situational information may also include an estimated time when the second computing device will receive an update for the potential impact target from the first computing device. The estimated time may be used to determine when to deploy a set of active safety mechanisms for the potential impact target. Each active safety mechanism may be configured to reduce a likelihood of damage to an object external to the autonomous vehicle caused by a collision. A signal is then sent to activate the set of active safety mechanisms prior to an impact with the object corresponding to the identified potential impact target.

20 Claims, 15 Drawing Sheets

(51) Int. Cl.

| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| B60R 21/0134 | (2006.01) | |
| B60R 21/01 | (2006.01) | |

(58) Field of Classification Search
CPC . B60R 2021/01211; B60R 2021/01279; B60R 2021/23509; B60R 2021/01013; B60R 21/0136; B60R 25/257; B60R 22/48; G01C 21/3626; G01C 21/3407; G01C 21/343; B60W 2050/146; B60W 2550/30; B60W 30/08; B60W 30/09; B60W 30/095; B60W 30/0953; B60W 40/105; B60W 50/0098; B60W 2040/0818; B60W 2540/04; B60W 2710/18; B60W 40/08
USPC ....... 340/669, 435, 439, 540, 584, 905, 971, 340/989; 701/1, 117, 45, 118, 70, 123, 701/22, 300, 461, 47, 487, 533, 99, 29.3, 701/33.4

See application file for complete search history.

(56) References Cited

U.S. PATENT DOCUMENTS

| | | | |
|---|---|---|---|
| 5,446,661 A * | 8/1995 | Gioutsos | B60R 21/013 180/273 |
| 5,899,946 A * | 5/1999 | Iyoda | B60R 21/0132 180/274 |
| 5,959,552 A * | 9/1999 | Cho | B60R 19/205 180/167 |
| 6,076,854 A | 6/2000 | Schenck et al. | |
| 6,085,151 A | 7/2000 | Farmer et al. | |
| 6,139,052 A | 10/2000 | Preamprasitchai | |
| 6,188,940 B1 | 2/2001 | Blackburn et al. | |
| 6,394,490 B2 | 5/2002 | Osmer et al. | |
| 6,439,330 B1 | 8/2002 | Paye | |
| 6,470,272 B2 * | 10/2002 | Cong | G01S 13/723 340/436 |
| 6,650,983 B1 * | 11/2003 | Rao | B60G 17/0165 342/42 |
| 6,702,320 B1 | 3/2004 | Lang et al. | |
| 6,749,218 B2 | 6/2004 | Breed | |
| 6,755,453 B2 * | 6/2004 | Kellas | B60R 19/42 188/377 |
| 6,775,605 B2 * | 8/2004 | Rao | B60R 21/013 280/733 |
| 6,776,436 B2 * | 8/2004 | Takagi | B60R 21/01512 280/735 |
| 6,819,991 B2 * | 11/2004 | Rao | B60R 21/013 180/274 |
| 6,831,572 B2 * | 12/2004 | Strumolo | B60Q 1/525 180/167 |
| 6,836,714 B1 * | 12/2004 | Nitschke | B60R 21/01 280/734 |
| 6,851,504 B2 * | 2/2005 | Campbell | B60R 21/013 180/271 |
| 6,917,305 B2 * | 7/2005 | King | B60R 21/013 340/435 |
| 7,009,500 B2 * | 3/2006 | Rao | B60R 21/013 340/435 |
| 7,048,086 B2 * | 5/2006 | Yoneda | B60R 21/36 180/274 |
| 7,050,606 B2 | 5/2006 | Paul et al. | |
| 7,174,985 B2 * | 2/2007 | Sawa | B60R 21/36 180/274 |
| 7,344,153 B1 | 3/2008 | Manneh et al. | |
| 7,350,804 B2 | 4/2008 | Bakhsh et al. | |
| 7,495,550 B2 * | 2/2009 | Huang | B60Q 1/525 340/435 |
| 7,506,716 B1 | 3/2009 | Salmon et al. | |
| 7,513,524 B2 * | 4/2009 | Oota | B60R 21/18 280/733 |
| 7,616,101 B2 * | 11/2009 | Kuttenberger | G01S 13/931 180/167 |
| 7,630,806 B2 * | 12/2009 | Breed | B60R 21/0134 180/273 |
| 7,660,438 B2 | 2/2010 | Camus | |
| 7,797,108 B2 * | 9/2010 | Grimm | G08G 1/168 340/435 |
| 8,041,483 B2 * | 10/2011 | Breed | B60R 19/205 192/113.35 |
| 8,447,472 B2 | 5/2013 | Joh et al. | |
| 8,463,500 B2 * | 6/2013 | Cuddihy | B60R 21/0132 280/735 |
| 8,474,865 B2 | 7/2013 | Grindle | |
| 8,554,461 B2 * | 10/2013 | Cuddihy | B60R 21/0134 340/436 |
| 8,594,919 B2 | 11/2013 | Munakata | |
| 8,655,537 B2 | 2/2014 | Ferguson et al. | |
| 8,700,257 B2 | 4/2014 | Tamura et al. | |
| 8,801,035 B2 * | 8/2014 | Kim | B60R 19/205 280/728.2 |
| 8,807,595 B2 * | 8/2014 | Nakamura | B60R 21/232 280/728.2 |
| 8,814,202 B2 * | 8/2014 | Matsushita | B60R 21/213 280/730.2 |
| 8,947,532 B2 | 2/2015 | Augst | |
| 9,061,638 B2 * | 6/2015 | Sievers | B60R 21/017 |
| 9,517,767 B1 * | 12/2016 | Kentley | B60N 2/002 |
| 9,630,619 B1 * | 4/2017 | Kentley | B60W 30/09 |
| 2003/0155750 A1 | 8/2003 | Hu et al. | |
| 2004/0069555 A1 * | 4/2004 | Yoneda | B60R 21/36 180/274 |
| 2004/0102984 A1 * | 5/2004 | Wahlbin | G06Q 40/08 705/4 |
| 2005/0151393 A1 | 7/2005 | Borg et al. | |
| 2006/0031015 A1 * | 2/2006 | Paradie | G06T 7/70 701/301 |
| 2006/0255573 A1 | 11/2006 | Tobata et al. | |
| 2006/0278461 A1 * | 12/2006 | Shen | B60R 21/0132 180/274 |
| 2006/0282218 A1 | 12/2006 | Urai et al. | |
| 2008/0243342 A1 * | 10/2008 | Breed | B60R 21/0132 701/45 |
| 2009/0010495 A1 | 1/2009 | Schamp et al. | |
| 2009/0248253 A1 * | 10/2009 | Le | B60R 21/0132 701/45 |
| 2009/0326766 A1 | 12/2009 | Wang | |
| 2012/0256402 A1 * | 10/2012 | Kato | B60R 21/213 280/730.2 |
| 2013/0035827 A1 * | 2/2013 | Breed | B60R 21/0132 701/45 |
| 2015/0000994 A1 | 1/2015 | McLundie | |
| 2015/0177007 A1 | 6/2015 | Su et al. | |
| 2015/0274107 A1 | 10/2015 | Le et al. | |
| 2015/0330473 A1 * | 11/2015 | Lombrozo | F16F 6/005 248/569 |
| 2015/0336524 A1 * | 11/2015 | Larner | B60R 11/04 293/120 |
| 2016/0059823 A1 | 3/2016 | Jayasuriya et al. | |
| 2017/0120902 A1 * | 5/2017 | Kentley | B60W 10/04 |
| 2017/0120904 A1 * | 5/2017 | Kentley | B60W 30/09 |

OTHER PUBLICATIONS

Airbag, Wikipedia, [Retrieved from the Internet Jun. 25, 2015, 21 pgs.; http://en.wikipedia.org/?title=Airbag].

* cited by examiner

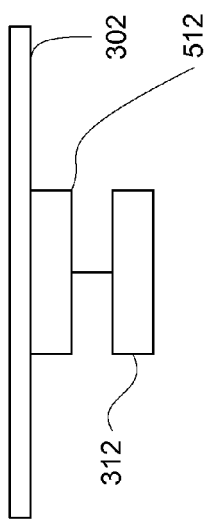
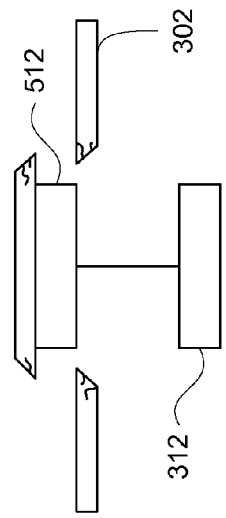
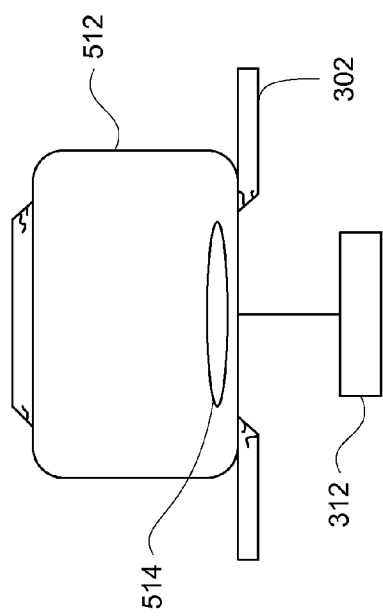
FIGURE 5A
FIGURE 5B
FIGURE 5C

INTELLIGENT DEPLOYMENT OF SAFETY MECHANISMS FOR AUTONOMOUS VEHICLES

CROSS REFERENCE TO RELATED APPLICATION

The present application is related to application Ser. No. 14/845,739, entitled "Active Safety Mechanisms For An Autonomous Vehicle", which is filed concurrently herewith.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decided when to speed up, slow down, stop, turn, etc. These decisions are used to maneuver between locations but also to interact with and avoid collisions with other objects along the way.

BRIEF SUMMARY

One aspect of the disclosure provides a method of deploying safety mechanisms in a vehicle. The method includes receiving, from one or more first computing devices having one or more processors by one or more second computing devices having one or more processors, situational information. The situational information identifies a potential impact target corresponding to an object with which the vehicle is predicted to have a collision within a predetermined period of time and an estimated time when the second computing device will receive an update for the potential impact target from the first computing device. The method also includes using, by the one or more second computing devices, the estimated time to determine when to deploy one or more active safety mechanisms. Each of the one or more safety mechanisms is configured to reduce a likelihood of damage to an object external to the vehicle caused by a collision. The method also includes sending, by the one or more second computing devices, a triggering signal to activate the one or more active safety mechanisms prior to an impact with the object corresponding to the identified potential impact target.

In one example, the method also includes selecting the one or more active safety mechanisms from a set of active safety mechanisms based on the situational information such that at least one of the active safety mechanisms of the set of active safety mechanisms is not included in the set. In one alternative, the situational information includes information identifying an impact point where the vehicle and the object are predicted to have the collision. The method also includes mapping the impact point to a point on an exterior of the vehicle, and selecting the one or more active safety mechanisms also based on the point on the exterior of the vehicle. In another alternative, the situational information includes a dimension of the identified potential impact target and the one or more active safety mechanisms is selected also based on the dimension. In this example, the method also includes using the dimension to classify the mass of the object, and the one or more active safety mechanisms is selected also based on the classification. In another alternative, the situational information also includes information identifying a type of object for the identified potential impact target and the one or more active safety mechanisms is selected also based on the type of object.

In another example, the one or more active safety mechanisms includes at least one primary active safety mechanism configured to reduce a likelihood of damage caused by a primary impact between a first object and vehicle and at least one secondary active safety mechanism configured to reduce a likelihood of damage caused by a secondary impact between the first object and a second object after and as a result of the primary impact. In this example, sending the triggering signal causes at least a portion of the vehicle to move in a way that a primary impact with the object corresponding to the identified potential impact target by the vehicle will reduce a likelihood of damage caused by a secondary impact with the object corresponding to the identified potential impact target and another object. In addition, the method also includes sending, in response to the received situational information, a status update to the one or more first computing devices identifying a status of the triggering signal.

In another example, the method also includes receiving, before receiving the situational information, second situational information identifying the potential impact target corresponding to the object with which the vehicle is predicted to have a collision within the predetermined period of time and a second estimated time when the second computing device will receive a second update for the potential impact target from the first computing device and determining, based on the estimated time, that the vehicle will wait for the second update before deploying the one or more active safety mechanisms. In this example, determining to wait for the second update is also based on a deployment time for the one or more active safety mechanisms.

Another aspect of the disclosure provides a system. The system includes one or more active safety mechanism configured to reduce a likelihood of damage to an object external to a vehicle caused by a collision between the object and the vehicle. The system also includes one or more first computing devices having one or more first processors. These one or more first processors are configured to receive, from one or more second computing devices having one or more second processors, situational information. The situational information identifies a potential impact target corresponding to an object with which the vehicle is predicted to have a collision within a predetermined period of time and an estimated time when the second computing device will receive an update for the potential impact target from the first computing device. The one or more first processors are also configured to use the estimated time to determine when to deploy the one or more active safety mechanisms and send a triggering signal to activate the one or more active safety mechanisms prior to an impact with the object corresponding to the identified potential impact target.

In one example, the one or more one or more first processors are configured to select the one or more active safety mechanisms from a set of active safety mechanisms based on the situational information such that at least one of the active safety mechanisms of the set of active safety mechanisms is not included in the set. In one alternative, the situational information includes information identifying an impact point where the vehicle and the object are predicted to have the collision. The one or more first processors are also configured to map the impact point to a point on an exterior of the vehicle, and select the one or more active safety mechanisms also based on the point on the exterior of the vehicle. In another alternative, the situational information includes a dimension of the identified potential impact target and the one or more first processors are also configured to select the one or more active safety mechanisms also based on the dimension. In this example, the one or more first processors are also configured to use the dimension to classify the mass of the object, and select the one or more active safety mechanisms also based on the classification. In another alternative, the situational information also includes information identifying a type of object for the identified potential impact target and the one or more first processors are also configured to select the one or more active safety mechanisms further based on the type of object.

In another example, the one or more active safety mechanisms includes at least one primary active safety mechanism configured to reduce a likelihood of damage caused by a primary impact between a first object and vehicle and at least one secondary active safety mechanism configured to reduce a likelihood of damage caused by a secondary impact between the first object and a second object after and as a result of the primary impact. In this example, the one or more first processors are also configured to receive, before receiving the situational information, second situational information identifying the potential impact target corresponding to the object with which the vehicle is predicted to have a collision within the predetermined period of time and a second estimated time when the second computing device will receive a second update for the potential impact target from the first computing device, and determine, based on the estimated time, that the vehicle will wait for the second update before deploying the one or more active safety mechanisms. In this example, the one or more first processors are further configured to determine that the vehicle will wait for the second update further based on a deployment time for the one or more active safety mechanisms.

BRIEF DESCRIPTION OF THE DRAWINGS

FIG. 5A-5C are examples of active safety mechanisms in accordance with aspects of the disclosure.

DETAILED DESCRIPTION

Overview

Figure 1:
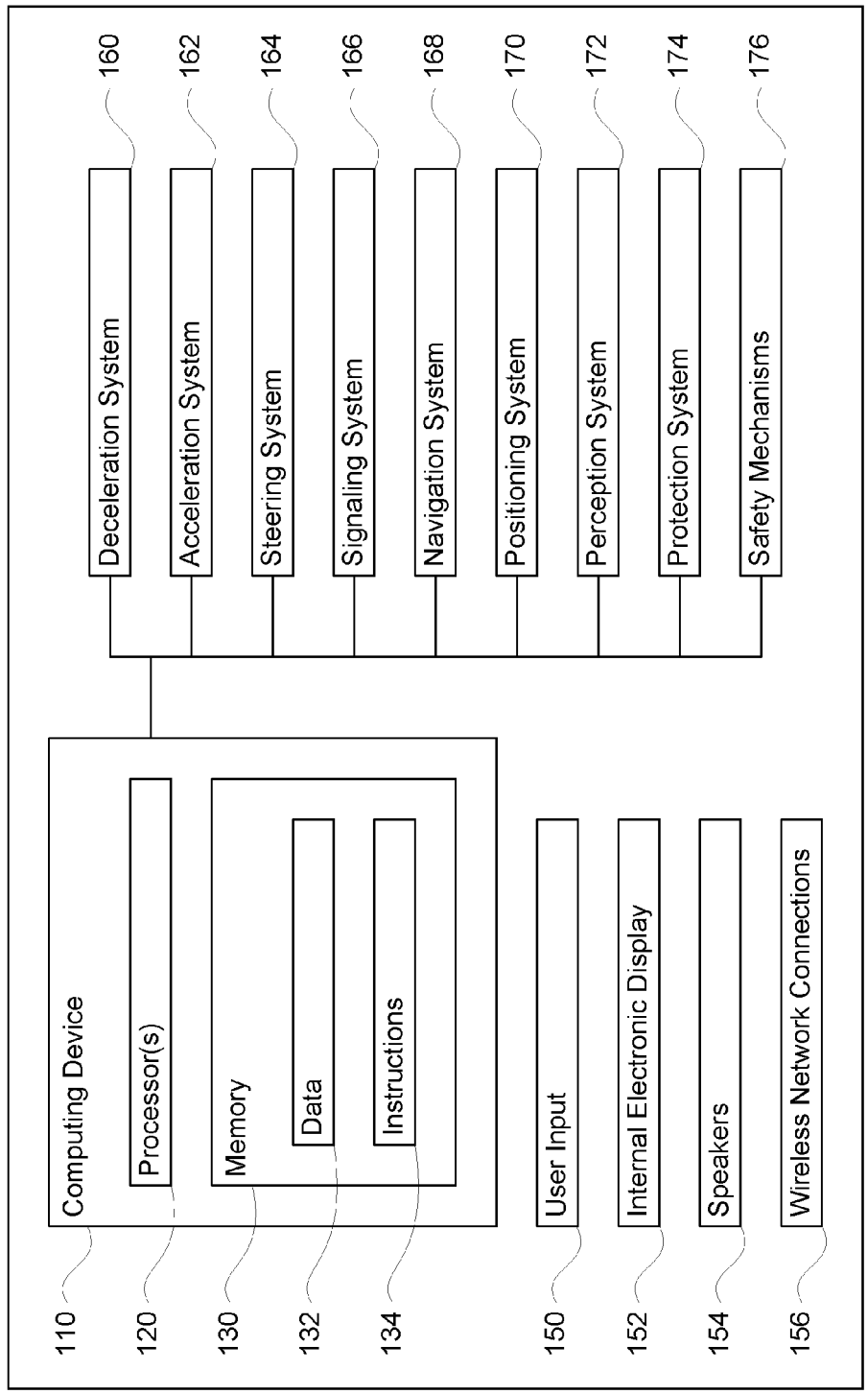
FIG. 1 is a functional diagram of an example vehicle in accordance with an exemplary embodiment.
Figure 2A:
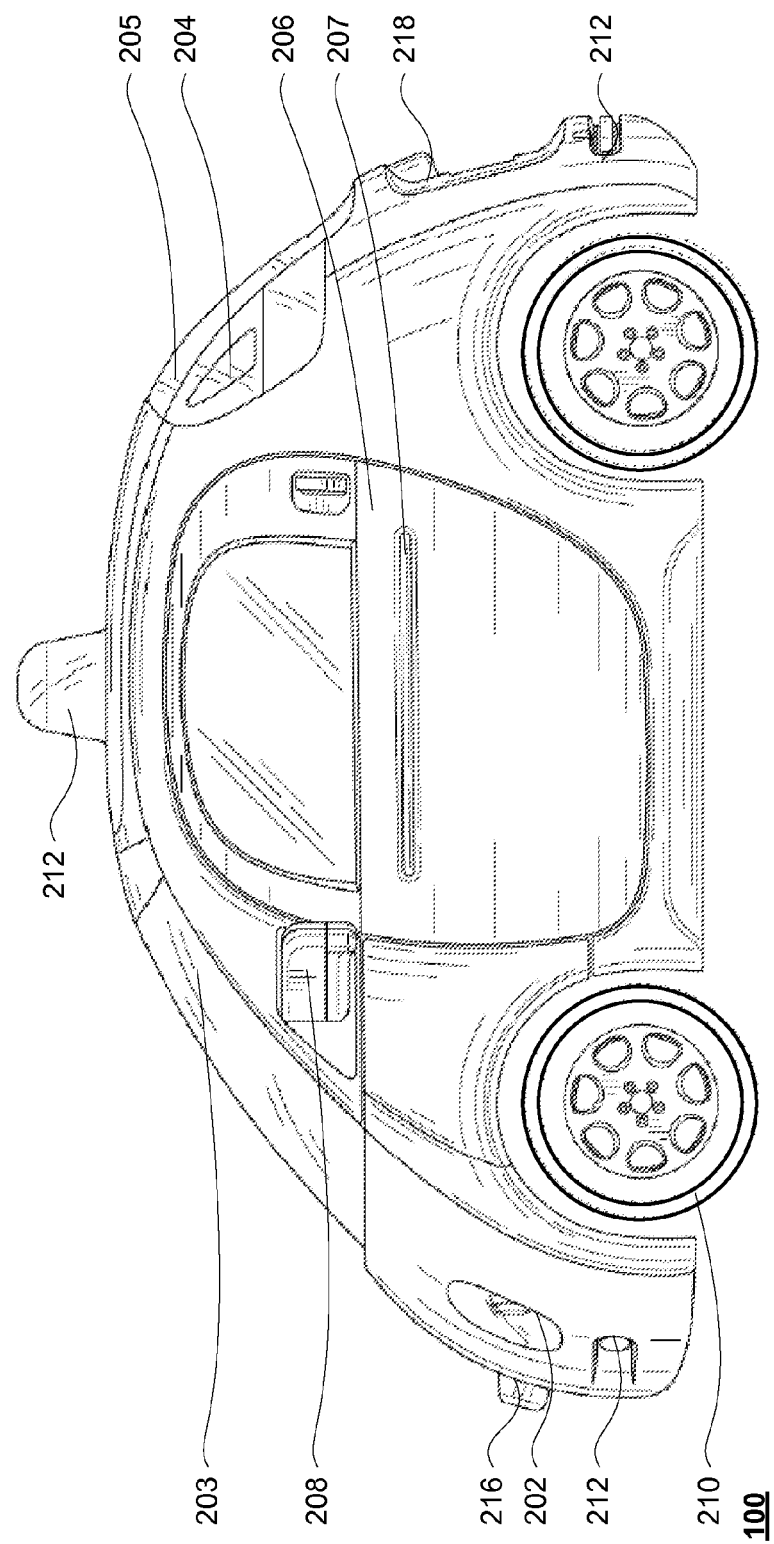
FIGS. 2A-2D are example external views of a vehicle in accordance with aspects of the disclosure.
Figures 2B, 2C:
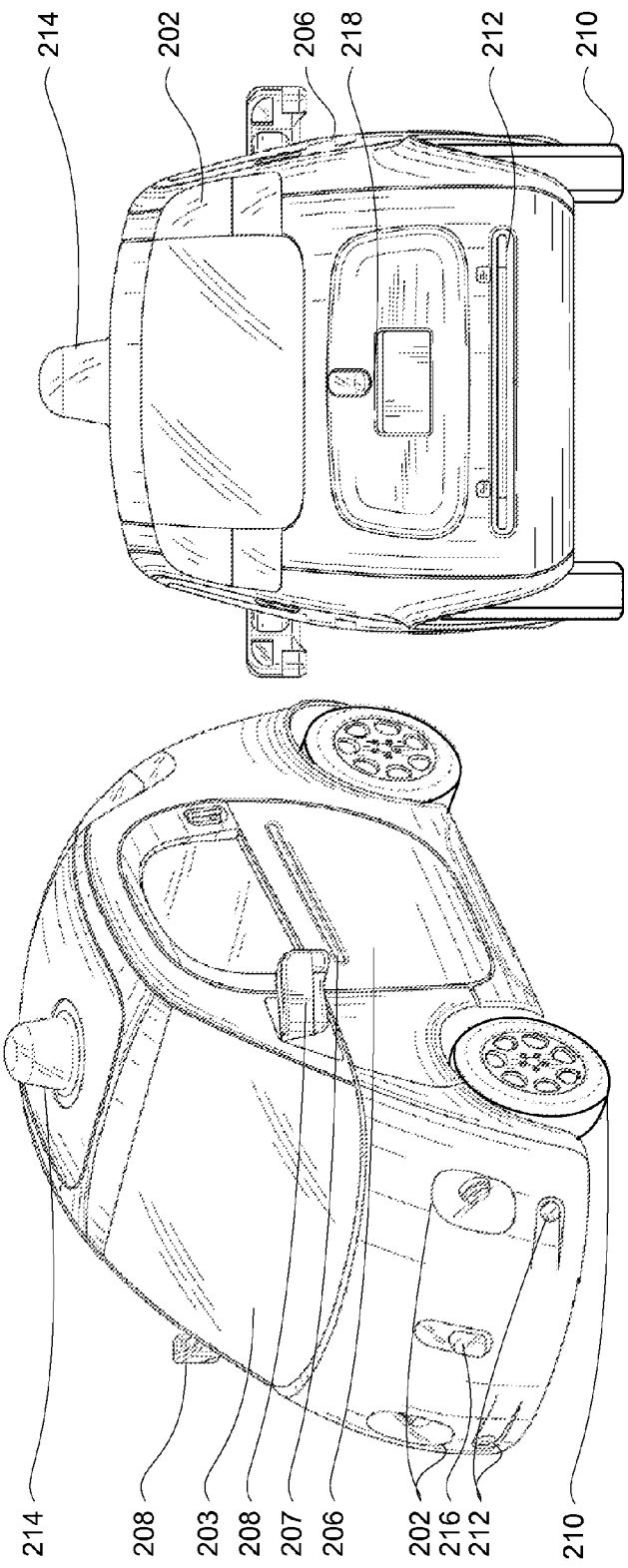
Figure 2D:
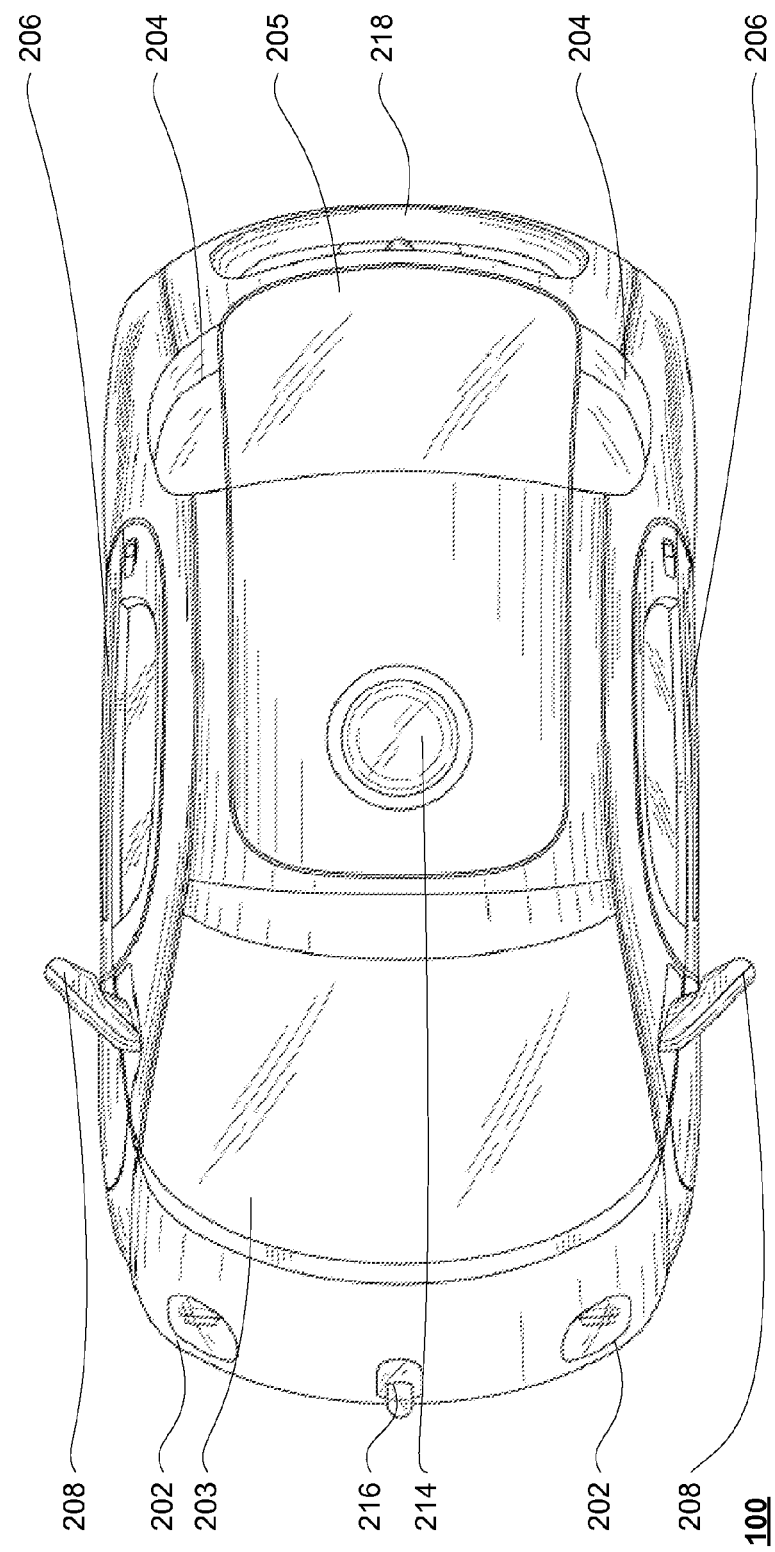

The technology relates to reducing the likelihood of severe injuries or damage to objects such as pedestrians, bicyclists, animals, other vehicles, or simply inanimate objects caused by collisions with autonomous vehicles. While avoiding collisions with other objects is a primary goal for autonomous vehicles, in rare circumstances, there may be an imminent and unavoidable impact. In other words, the vehicle's computing devices determine that an impact cannot be avoided by way of braking, steering, or accelerating the vehicle. When this is the case, an autonomous vehicle's computing devices may work to deploy safety mechanisms in advance of an impact. By doing so, the vehicle can reduce the amount of damage caused to the object, thus increasing the safety of the vehicle and reducing the risk of injury to other objects.

In order to maneuver the vehicle as safely as possible, an autonomous vehicle may have a highly sophisticated perception system including a plurality of sensors. These sensors may detect objects in the vehicle's environment as well as characteristics of those objects such as their location, speed, heading, size (length height and width), type, and approximate center of gravity. For example, the perception system may use the height of an object identified as a pedestrian (or human) to estimate the approximate center of gravity of the object. In this regard, the vehicle's computing devices may compare the characteristics of the object to known anthropomorphic data to determine an approximate center of gravity. For other object types, the approximate center of gravity may be determined from the characteristics of the object using various known statistical analyses.

In addition to sensors, the vehicle may also include a plurality of safety mechanisms for reducing the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent. In addition, at least some of these safety mechanisms may reduce the likelihood of damage to an object during or after a secondary impact.

Some of these active safety mechanisms may act to reconfigure the vehicle. As an example, these active safety mechanisms may be moved in order to position a safety mechanism at or close to a point on the vehicle where an impact with an object is expected to occur. In addition, features of the active safety mechanisms may be configured to extend the impact as long as possible such that the impact occurs over a period of time, thereby reducing the force of the impact. This may include movable airbags or foam energy absorbers. As another example, an active safety mechanism may be configured to move a portion of the front end of the vehicle towards the object and another portion of the front end away from the object such that the portion of the vehicle that is moved towards the object acts as a damper. In this example, the front end of the vehicle may have a plurality of such portions. In order to facilitate the movement described above, the active safety mechanisms may be mounted on rails, a pulley system, pneumatic actuator having multiple configurations, or a combination of these. A motor may be configured to move the active safety mechanism to a predetermined location on the vehicle.

The active safety mechanisms may also include some type of actuator, such as a solenoid, pyrotechnics, or pneumatic actuator to deploy the active safety mechanism. In some examples, such as an airbag, the airbag may be configured to inflate from different points (i.e. more than one actuator), further increasing the ability to "aim" the deployment of the airbag. In this regard, by varying the fill of an airbag, the "center" of the airbag may be moved.

At least some of the active safety mechanisms may be located beneath a surface of a vehicle for aesthetic reasons. In these examples, various areas, such as the hood of the vehicle, may be configured to crumble or break away during or immediately before the active safety mechanism is activated. In one example, the hood may be a brittle shell that can be broken by the force of the active safety mechanism on an inner surface of the front end such as an airbag. This brittle shell may include plastics (such as polyurethane skins, thermos polyurethane, or scored material with grooves which allow the surface of the front end to be broken.

Prior to deploying the safety mechanisms, the vehicle's computing devices may use information from the vehicle's sensors to identify and track objects in the vehicle's environment. For example, one or more computing devices of the perception system may use information from the vehicle's sensors to detect and identify the characteristics (size, speed, shape, direction, object type, etc.) of various objects in the vehicle's environment. In addition, the vehicle's computing devices may use the characteristics of the object, such as speed and heading, to predict future locations where the object will be.

The vehicle's computing devices may also determine whether the future locations indicate that the vehicle will collide with the object. In most cases, if a collision is likely, the vehicle's computing devices may maneuver the vehicle in order to avoid the object. However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's computing devices may send a signal to the protection system in order to deploy one or more of the active safety mechanisms.

In order to determine how and which of the active safety mechanisms to deploy, situational information may be provided to other systems of the vehicle. This situational information may be provided, for example, via controller area network or CAN bus though other systems may also be used. The situational information may include a number of the potential impact targets or objects with which the vehicle is predicted to have a collision imminently. For each of these targets, the situational information may also include the minimum predicted time to impact, an impact point or area which identifies a three dimensional location where an impact is likely to occur, and when the object protection system can expect to receive the next update from the perception system. Where available, the situational information may include further details on the vehicle and/or the potential impact targets.

The situational information may be received by one or more computing devices of the vehicle. As an example, the one or more computing devices may be a main computing system of the vehicle or incorporated into the protection system or another system of the vehicle. In response to receiving the situational information, the vehicle's computing devices may use the situational information to determine whether to deploy any of the active safety mechanisms or wait for an update. Because of this, the time bases of the vehicle's computing devices must be synchronized. When the vehicle's computing devices determine that active safety mechanisms should be deployed, deployment may be achieved by sending a trigger signal to the active safety mechanisms.

Using the situational information, the vehicle's computing devices may use the additional details to determine which of the active safety mechanisms to deploy and how. In this regard, rather than deploying all of the active safety mechanisms, the vehicle's computing devices may identify a subset of the safety mechanisms that would be most effective to reduce the likelihood of injury or damage to the object given the additional details.

In one example, the vehicle's computing devices may map the impact point to a location on the vehicle, the one or more computing devices may deploy the safety mechanisms that would most effectively reduce injury caused at or near the mapped location as opposed to safety mechanisms that would be ineffectual. Similarly, the vehicle's computing devices may identify or select the safety mechanism that will be closest to the mapped location or that can be moved closest to the impact point before an estimated time of the impact.

The vehicle's computing devices may then maneuver the selected active safety mechanism, for example using the motor or pulley system, such that the active safety mechanism will be located close to or at the mapped location at the estimated time of the impact.

In some cases, moving a selected active safety mechanism may not be sufficient to ensure that the object will collide with the active safety mechanism. This may be the case where the closest active safety mechanism can only be moved proximate to the mapped location and not completely to the mapped location. In other words, the active safety mechanism may be a few centimeters or so away or off center from the point. In this case, the vehicle's computing devices may move the vehicle itself to align the active safety mechanism to the impact point.

Similarly, in some examples, after moving the selected active safety mechanism to the desired location, the selected active safety mechanism may be deployed in a way that further increases the likelihood that the collision with the vehicle will occur at the mapped location. As an example, the vehicle's computing devices may identify how to deploy an air bag, such as by selecting between different actuators located at different points within the airbag such that the fullest portion of the airbag at the time of impact will correspond to the impact point.

Once the selected active safety mechanism has been positioned, the autonomous vehicle's computers may deploy the active safety mechanism or wait until a certain amount of time before the estimated time of the impact when needed as in the case of an airbag which takes time to deploy. In some examples, after repositioning the selected active safety mechanism, the vehicle's computing devices may simply deploy all of the active safety mechanisms at once to attempt to reduce the likelihood of damage or injury to the object as much as possible.

In some examples, where the situational information includes additional information about the object, the vehicle's computing devices may determine how to move the active safety mechanism and/or vehicle, in order to contact the object with the safety mechanism at a particular location on the object. In other words, the vehicle's computing devices may determine how to move the impact point to a location corresponds to an active safety mechanism and an approximate center of mass of the object. Thus, in some examples, the situational information may include characteristics of the object such as the type of object, height and width. In this regard, the vehicle's computers may use characteristics of the object to provide an estimate of the center mass of the object. In turn, the vehicle's computing device may determine a predicted location of estimate of the center of mass of the object at the time of impact. This predicted location may then be used as a "new" impact point. Using this new impact point, the vehicle's computing device may determine which active safety mechanism to move towards the new impact point before the estimated time of the impact, how to maneuver the vehicle to move the active safety mechanism closer to the new impact point before the estimated time of the impact, and when to deploy the active safety mechanism.

By contacting an object at an approximate center of gravity, the autonomous vehicle may reduce the likelihood of rotating the object, thereby decreasing the likelihood and severity of multiple impacts with the vehicle. In addition, if the object is a person, the center of gravity may be close to the person's hips therefore reducing the likelihood of impact with a person's head or neck. Finally, by extending the length (time and distance) of the impact, the change in velocity of the object caused by the front end of the vehicle may be achieved more gradually, thereby lowering peak forces. This in turn may reduce injury or damage to the object as well.

In addition to receiving situational information and sending trigger signals, the one or more computing devices of the object protection system may also send information back to the one or more control computing devices. For example, this information may include status information about triggering any of the active safety mechanisms.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Vehicle 100 also includes sensors of the perception system 172. For example, housing 212 may include one or more laser devices for having 360 degree or narrower fields of view and one or more camera devices. Housings 216 and 218 may include, for example, one or more radar and/or sonar devices. The devices of the perception system may also be incorporated into the typical vehicle components, such as taillights 204 and/or side view mirrors 208. Each of these radar, camera, and lasers devices may be associated with processing components which process data from these devices as part of the perception system 172 and provide sensor data to the computing device 110.

These sensors of perception system 172 may detect objects in the vehicle's environment as well as characteristics of those objects such as their location, speed, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which makes then determines whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent. In addition, at least some of these safety mechanisms may reduce the likelihood of damage to an object during or after a secondary impact.

Figure 3:
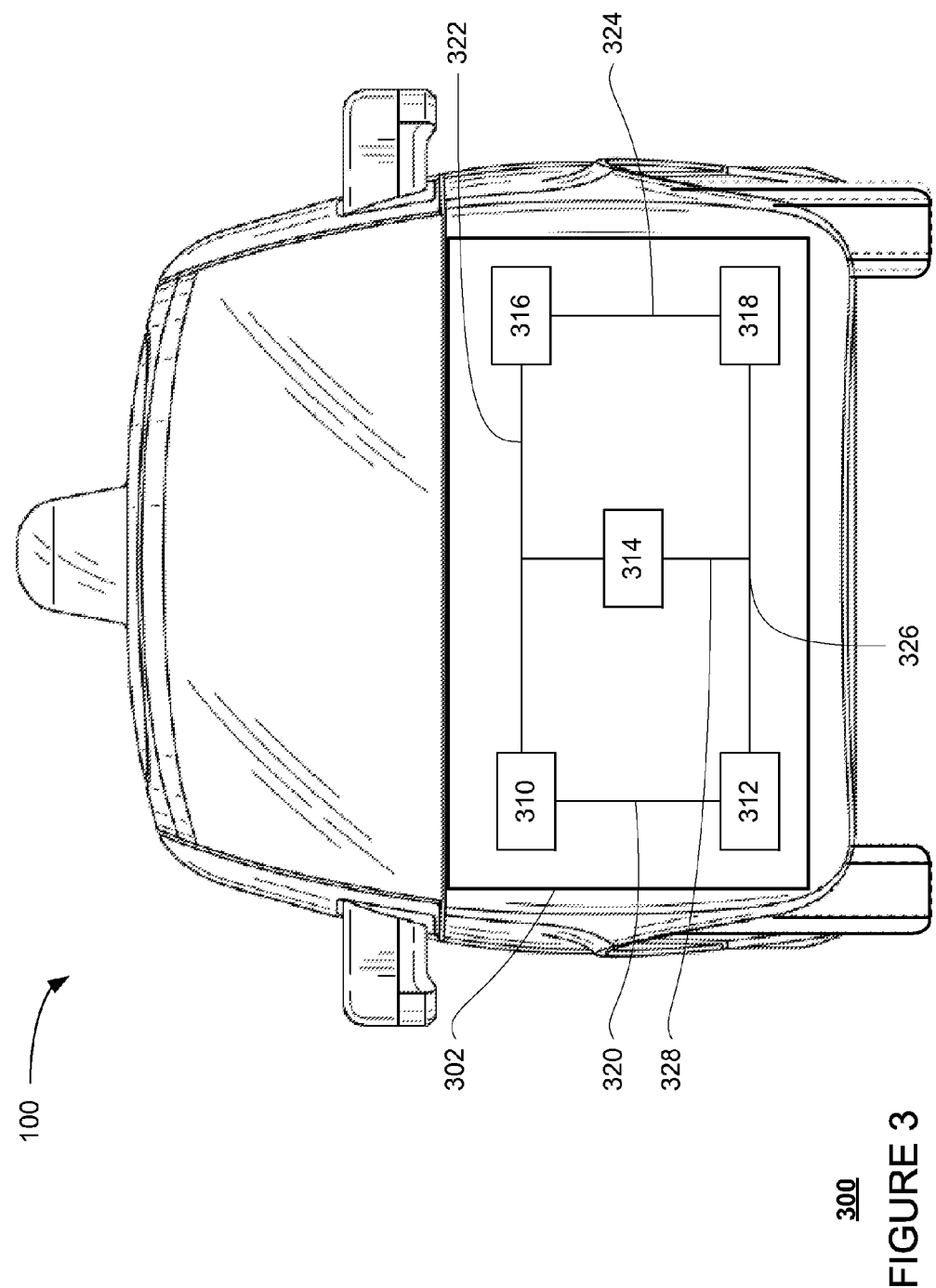
FIG. 3 is an example diagram of a vehicle and a plurality of active safety mechanisms in accordance with aspects of the disclosure.

Some of these active safety mechanisms may act to reconfigure the vehicle. As an example, these active safety mechanisms may be moved in order to position a safety mechanism at or close to a point on the vehicle where an impact with an object is expected to occur. In addition, features of the safety mechanisms may be configured to extend the impact duration, thereby reducing the peak force of the impact. For instance FIG. 3 is an example view 300 of a front end of vehicle 100 depicting an arrangement of a plurality of active safety mechanisms 310-318. For example, each of these active safety mechanisms 310-318 may include a movable airbag or foam energy absorber.

In order to facilitate the movement of the active safety mechanisms relative to the hood, the active safety mechanisms may be mounted on rails, a pulley system, pneumatic actuator having multiple configurations, or a combination of these. A motor may be configured to move the active safety mechanism to a predetermined location on the vehicle. For example, returning to FIG. 3, safety mechanisms 310-318 are mounted on a series of rails 320-328. In this regard, active safety mechanism 310 may move downward along rail 320 or across along rail 322. Similarly active safety mechanism 314 may move downward or upward along rail 328.

As another example, a active safety mechanism may be configured to move a portion of the vehicle towards the object or location of impact. At the same time, another portion of the front end may be moved away from the object such that the portion of the vehicle that is moved towards the object acts as a damper. In this example, the front end of the vehicle may have a plurality of such portions. For example, safety mechanisms 310 may be configured to move the outer surface of the front end of the vehicle, such as the vehicle's hood 302, in different directions. At the same time, active safety mechanism 316 may be configured to move the outer surface of the front end of the vehicle as well. By working in concert, safety mechanisms 310 and 316 may move and "tilt" the hood in different directions.

Figure 4A:
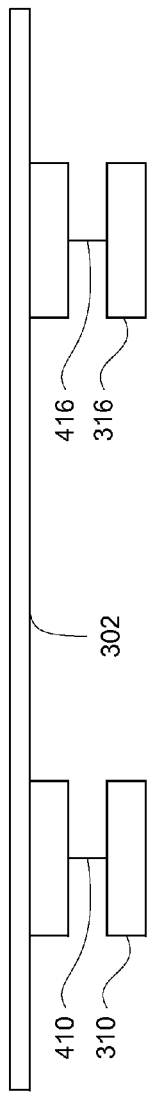
FIG. 4A-4C are examples of active safety mechanisms in accordance with aspects of the disclosure.
Figure 4B:
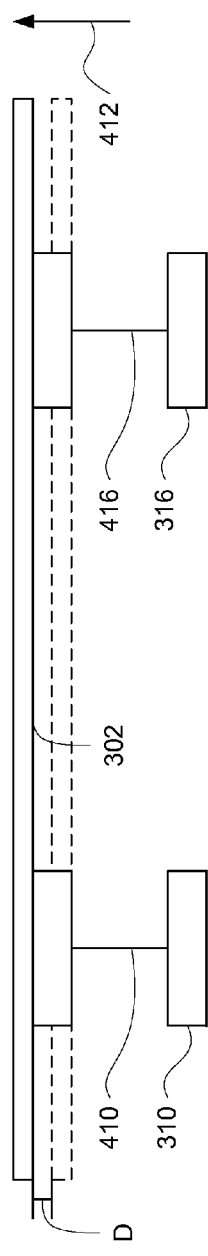
Figure 4C:
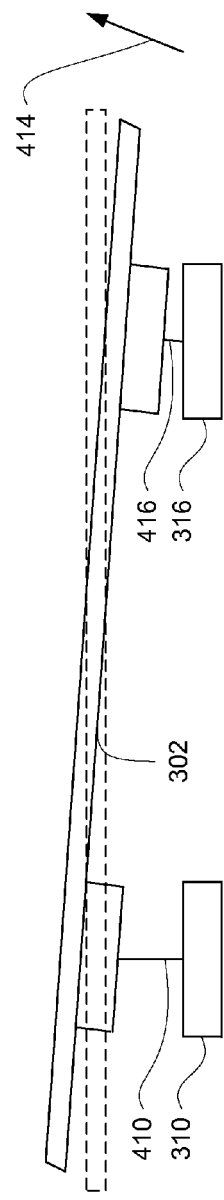

FIGS. 4A-4C are examples of a damper configuration. In this example, active safety mechanisms 310 and 316 are located beneath hood 302. In FIG. 4A, the safety mechanisms are in a first, default position. When an impact is imminent, these active safety mechanisms may be moved in order to tilt the hood 302 towards the object. In this regard, in FIG. 4B, safety mechanisms 310 and 316 are extended, pushing hood 302 outward in the direction of arrow 412. This extension may be achieved by using a piston 410, 416 or other extension mechanism. The extension increases the distance that the hood will move back towards the vehicle during an impact in an amount corresponding to the distance D of the extension. For reference, the default position of hood 302 is shown in dashed line. Increased distance for the hood to travel during an impact extends the impact duration, which in turn lowers the peak forces and lessens the likelihood of damage or injury to the object.

In addition to extending the hood, the active safety mechanisms may also move the hood in different directions. For example, in FIG. 4C, safety mechanism 310 is extended and tilted and safety mechanism 316 is retracted and tilted, moving hood 302 in the direction of arrow 414. For reference, the default position of hood 302 is shown in dashed line. This tilting, extension, and retraction may be achieved by using multiple pistons (e.g. pistons 410, 416 may include a plurality of pistons) or other such mechanisms.

Although only two active safety mechanisms are shown the examples of FIGS. 4A-4C for simplicity, any number of such active safety mechanisms may be used. In this regard, additional active safety mechanisms 312, 314, and 318 may also be used alone or in conjunction with active safety mechanisms 310 and 316 to move the hood. In addition, as noted above, each of these active safety mechanisms may be configured to move relative to the hood, for example along the rails 320-328. The configuration of the active safety mechanisms on rails may thus provide for an almost infinite number of ways that the hood can be moved.

The active safety mechanisms may also include one or more actuators, such as solenoids, pyrotechnics, or pneumatic actuators to deploy the active safety mechanism. In some examples, such as an airbag, the airbag may be configured to inflate and/or vent from different points (i.e. more than one actuator), further increasing the ability to "aim" the deployment of the airbag. In this regard, by varying the fill of an airbag, the "center" of the airbag may be moved.

At least some of the active safety mechanisms may be located beneath a surface of a vehicle for aesthetic reasons. In these examples, the hood of the vehicle may be configured to crumble or break away during or immediately before the active safety mechanism is activated. In one example, the hood may be a brittle shell that can be broken by the force of the active safety mechanism on an inner surface of the hood such as an airbag. For example, as shown in FIGS. 5A-5C, active safety mechanism 312 may include an airbag 512 located beneath hood 302. FIG. 5A represents a default or rest location of active safety mechanism 312 and airbag 512. In FIG. 5C, prior to inflating the airbag 512, the airbag is pushed through the hood 302 breaking the brittle material into pieces. As shown in FIG. 5C, after passing through the hood 302, the airbag 512 may be inflated and vented through vent 514 in order to reduce the amount of damage or injury to an object during an impact. This brittle shell may include plastics (such as polyurethane skins, thermos polyurethane, or scored material with grooves which allow the surface of the front end to be broken.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
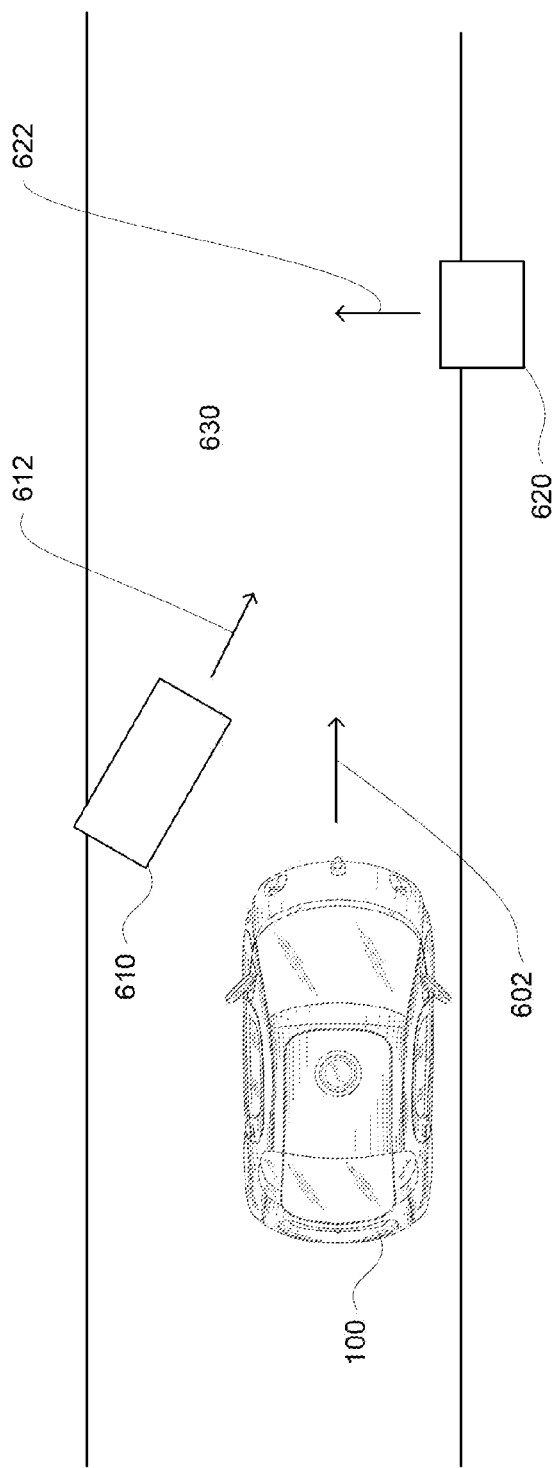
FIG. 6 is an example situational diagram in accordance with aspects of the disclosure.

Prior to deploying the safety mechanisms, vehicle's computing devices may use information from the vehicle's sensors to identify and track objects in the vehicle's environment. For example, one or more computing devices of the perception system may use information from the vehicle's sensors to detect and identify the characteristics (size, speed, shape, direction, object type, etc.) of various objects in the vehicle's environment. FIG. 6 is an example 600 bird's eye view of vehicle 100 as it drives along roadway 630 in the direction of arrow 602. In this example, the one or more computing devices of the perception system 174 may identify, among other things, the locations and object types of two objects in the vehicle's environment: bicyclist 610 and pedestrian 620. After a brief period of tracking these objects, the perception system 174 may determine the speeds and headings of these objects as shown by arrows 612 and 622.

Figure 7:
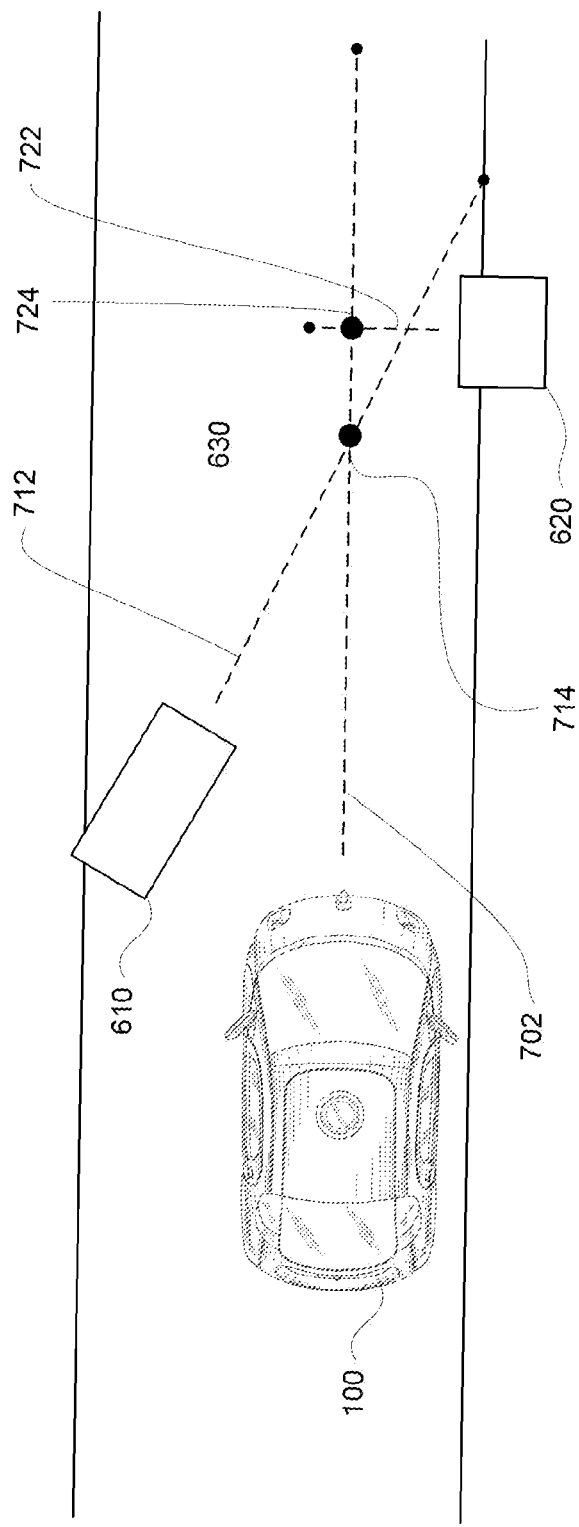
FIG. 7 is an example situational diagram in accordance with aspects of the disclosure.

In addition, the vehicle's computing devices may use the characteristics of the object, such as speed and heading, to predict future locations where the object will be. For example, as shown in example 700 of FIG. 7, trajectory lines 702, 712 and 722 represent predicted future locations of vehicle 100, bicyclist 610, and pedestrian 620. Because the predicted future locations of these objects is just that, a prediction, predictions may quickly become less accurate the farther into the future they become.

The vehicle's computing devices may also determine whether the future locations indicate that the vehicle will collide with the object. For example, the perception system or computing device 110 may determine that an impact with bicyclist 610 and pedestrian 620 is likely to occur at the locations of predicted impact points 714 and 724, respectively. Each of these impact points may be defined as a three-dimensional coordinate (x, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of bicyclist 610 and pedestrian 620.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's computing devices may send a signal to the protection system in order to deploy one or more of the active safety mechanisms. For example, the vehicle's computing devices may determine that the vehicle will not be able to safely maneuver out of the way in order to avoid bicyclist 610 before the bicyclist and vehicle reach impact point 714.

In order to determine how and which of the active safety mechanisms to deploy, situational information may be provided to other systems of the vehicle. This situational information may be provided, for example, via controller area network or CAN bus though other systems may also be used. The situational information may include a number of the potential impact targets or objects with which the vehicle is predicted to have a collision imminently. For each of these targets, the situational information may also include the minimum predicted time to impact, an impact point or area which identifies a three dimensional location where an impact is likely to occur, and when the object protection system can expect to receive the next update from the perception system. Where available, the situational information may include further details on the vehicle and/or the potential impact targets.

For example, the one or more computing devices of the vehicle's perception system may generate situational information for each of bicyclist 610 and pedestrian 620. For the bicyclist, this may include the minimum amount of time that the vehicle 100 and the bicyclist 610 are expected to reach the impact point 714. Similarly, the minimum predicted time to impact for pedestrian 620 may include the minimum amount of time that the vehicle 100 and the pedestrian 620 are expect to reach the impact point 724. In addition, the situation information would identify points 714 and 724, respectively as well as when or how soon the one or more computing devices of the vehicle's perception system are likely to provide an update for the situational information of each of the bicyclist and the pedestrian. Because different objects may be located in different places relative to the vehicle which has various different sensors mounted at different locations providing data that may require processing time, this update time may differ for different objects.

The situational information may be received by one or more computing devices of the vehicle. As an example, the one or more computing devices may be a main computing device of the vehicle or incorporated into the protection system or another system of the vehicle. In response to receiving the situational information, the vehicle's computing devices may use the situational information to determine whether to deploy any of the active safety mechanisms or wait for an update. Because of this, the time bases of the vehicle's computing devices must be synchronized.

For example, the situational information for bicyclist 610 may indicate that an impact is likely to occur in 1.5 seconds. In addition, the update time for the bicyclist may be 0.25 seconds. If the slowest active safety mechanism would take 0.75 seconds to deploy, then the vehicle's computing devices may determine that even after the update, there would be sufficient time, 1.25 second to move and deploy even the slowest active safety mechanism. Because of this, rather than deploying any active safety mechanism, the vehicle's computing devices may instead wait for an update for the situational information of the bicyclist. However, as a further safety precaution, if no update is received when there is at least 0.75 seconds or more left until the time of the impact, the vehicle's computing devices may instead deploy an active safety mechanism as discussed further below. The foregoing times are merely examples. Thus differing update times, etc. may be expected during actual operation.

Using the situational information, vehicle's computing devices may use the additional details to determine which of the active safety mechanisms to deploy and how. In this regard, rather than deploying all of the active safety mechanisms, the vehicle's computing devices may identify a subset of the safety mechanisms that would be most effective to reduce the likelihood of injury or damage to the object given the additional details.

Figure 8:
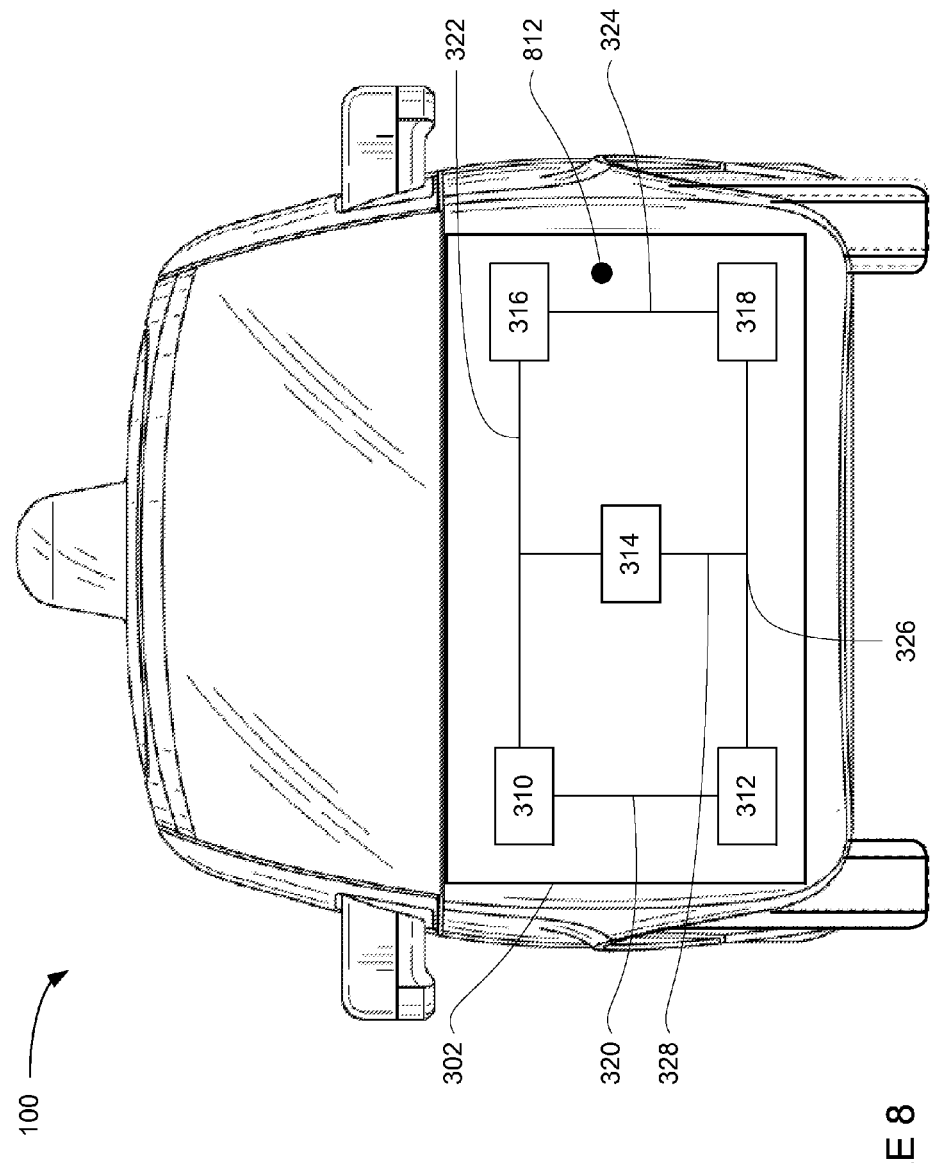
FIG. 8 is an example diagram of a vehicle in accordance with aspects of the disclosure.

In one example, the vehicle's computing devices may map the impact point to a location on the vehicle, the one or more computing devices may deploy the safety mechanisms that would most effectively reduce injury caused at or near the mapped location as opposed to safety mechanisms that would be ineffectual. Similarly, the vehicle's computing devices may identify or select the safety mechanism that will be closest to the mapped location or that can be moved closest to the impact point before an estimated time of the impact. For example, as shown in example 800 of FIG. 8, when vehicle reaches impact point 714, the point on the vehicle 812 which will be at the impact point 714 may be identified. In this regard, active safety mechanism 316 is located closest to the point on the vehicle 812. In addition, because active safety mechanism 316 is located on and can be moved along rail 324, active safety mechanism 316 may be moved closer to the point on the vehicle 812.

Figure 9:
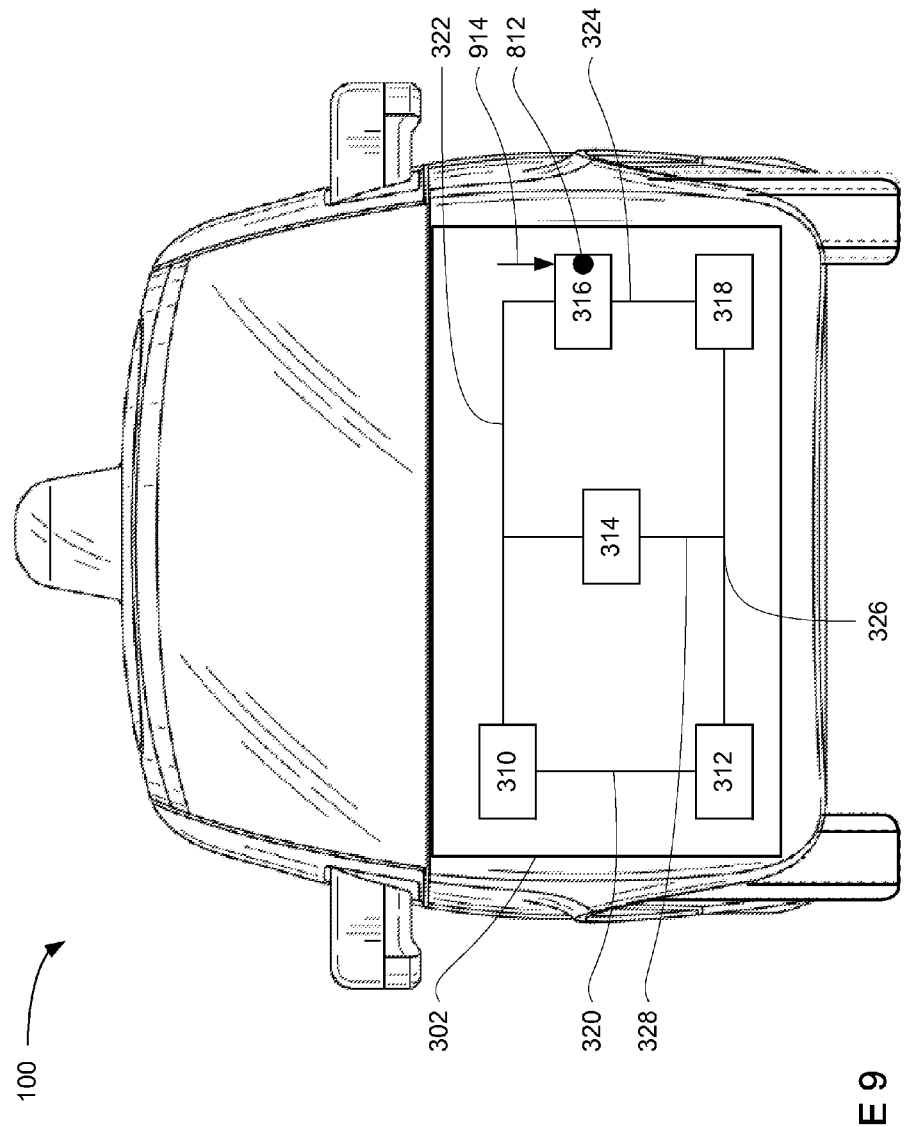
FIG. 9 is another example diagram of a vehicle in accordance with aspects of the disclosure.

The vehicle's computing devices may then maneuver the selected active safety mechanism, for example using the motor or pulley system, such that the active safety mechanism will be located close to or at mapped location at the estimated time of the impact. For example, as shown in example 900 of FIG. 9, prior to deploying the active safety mechanism 316, the active safety mechanism may be moved along rail 324 in the direction of arrow 914 so that a center or most beneficial impact point of the active safety mechanism is as close as possible to the point on the vehicle 812.

Figure 10:
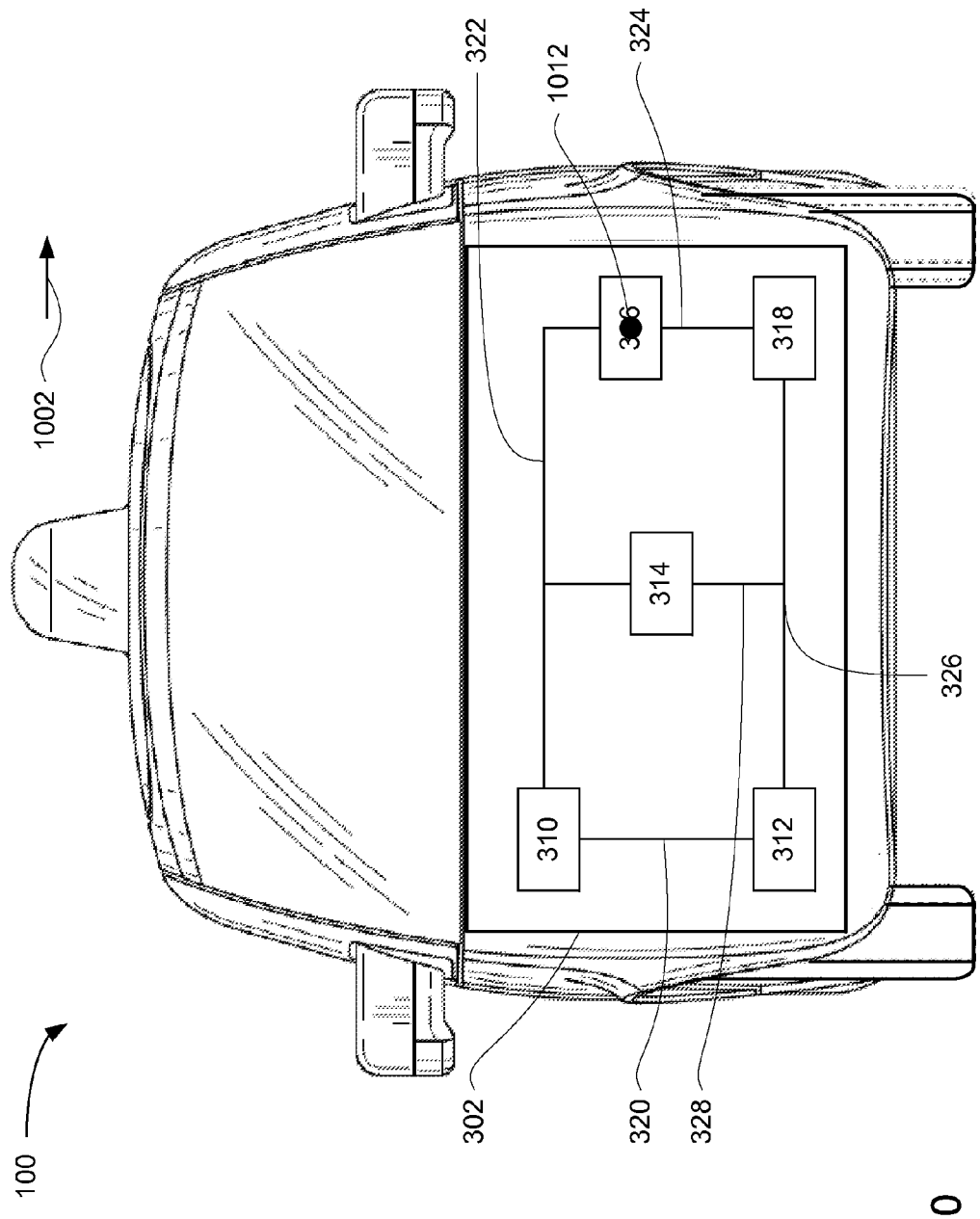
FIG. 10 is an example diagram of a vehicle in accordance with aspects of the disclosure.

In some cases, moving a selected active safety mechanism may not be sufficient to ensure that the object will collide with the active safety mechanism. This may be the case where the closest active safety mechanism can only be moved proximate to the mapped location and not completely to the mapped location. In other words, the active safety mechanism may be a few centimeters or so away or off center from the point as can be seen in the example 1000 of FIG. 10. In this case, the vehicle's computing devices may move the vehicle itself, for example in the direction of arrow 1002, to align the center active safety mechanism 1012 to the impact point at the predicted time of impact. In other words, the point on the vehicle 812 is remapped to the desired point on the active safety mechanism 1012, so that the vehicle's computing devices can "aim" the desired point towards the impact point.

Similarly, in some examples, after moving the selected active safety mechanism towards the impact point, the selected active safety mechanism may be deployed in a way that further increases the likelihood that the collision with the vehicle will occur at the mapped location. As an example, the vehicle's computing devices may identify how to deploy an air bag, such as by selecting between different actuators located at different points within the airbag such that the fullest portion of the airbag at the time of impact will correspond to the impact point.

Once the selected active safety mechanism has been positioned, the autonomous vehicle's computers may deploy the active safety mechanism or wait until a certain amount of time before the estimated time of the impact when needed as in the case of an airbag which takes time to deploy. When the vehicle's computing devices determine that active safety mechanisms should be deployed, deployment may be achieved by sending a trigger signal to the active safety mechanisms. This triggering signal may be sent for example by computing device 110 or the one or more computing devices of protection system 174. For example, once the active safety mechanism 316 has reached or is near the point on the vehicle 812, the one or more computing devices of the perception system 172 may send a signal to active safety mechanism. This signal may cause the piston 416 (as well as piston 410) to move the active safety mechanism 316 into the desired orientation in order to reposition the hood 302 as described above.

In some examples, after repositioning the selected active safety mechanism, the vehicle's computing devices may simply deploy all of the active safety mechanisms at once to attempt to reduce the likelihood of damage or injury to the object as much as possible. In this regard, active safety mechanisms 310-318 may all be deployed at once including the dampeners of active safety mechanisms 310 and 316 and airbag 512 of active safety mechanism 312 as shown in FIGS. 5B and 5C. However, in some cases deploying all active safety mechanisms may provide a less satisfactory result than deploying only those safety mechanisms that are likely to be useful. For example, deploying all active safety mechanisms could potentially cause further injury or damage to the object. In addition, doing so may add to the costs of repairing the vehicle and replacement of active safety mechanisms.

Where the situational information includes additional information about the object, the vehicle's computing devices may determine how to move the active safety mechanism and/or vehicle, in order to contact the object with the safety mechanism at a particular location on the object. In other words, the vehicle's computing devices may determine how to move the impact point to a location corresponds to an active safety mechanism and an approximate center of mass of the object. Thus, in the example 700 of FIG. 7, the situational information may include characteristics of each of the bicyclist 610 and the pedestrian 620 such as the type of object (bicyclist), height and width.

The vehicle's computers may use characteristics of the object to provide an estimate of the center mass of the object. In this regard, the vehicle's computing devices may compare the characteristics of the bicyclist to known anthropomorphic data to determine an approximate center of gravity of the bicyclist (with or without the bicycle). For other object types, the approximate center of gravity may be determined from the characteristics of the object using various known statistical analyses.

In turn, the vehicle's computing device may determine a predicted location of estimate of the center of mass of the object at the time of impact. This predicted location may then be used as a "new" impact point. Using this new impact point, the vehicle's computing device may determine which active safety mechanism to move towards the new impact point before the estimated time of the impact, how to maneuver the vehicle to move the active safety mechanism closer to the new impact point before the estimated time of the impact, and when to deploy the active safety mechanism as discussed above.

By contacting an object at an approximate center of gravity, the autonomous vehicle may reduce the likelihood of rotating the object, and thus limiting the likelihood of damage to the object and decreasing the likelihood of multiple impacts with the vehicle. In addition, if the object is a person, the center of gravity may be close to the person's hips therefore reducing the likelihood of impact with a person's head or neck. Finally, by extending the length (time and distance) of the impact, the change in velocity of the object caused by the front end of the vehicle may be achieved more slowly. This in turn may reduce injury or damage to the object as well.

In addition to receiving situational information and sending trigger signals, the one or more computing devices of the object protection system may also send information back to the one or more control computing devices. For example, this information may include status information about triggering any of the active safety mechanisms.

Although the examples described herein are related to the use of vehicles when operating in autonomous driving modes, such features may also be useful for vehicles operating in manual or semi-autonomous modes or for vehicles having only manual driving mode and semi-autonomous driving modes. In such cases, an active safety mechanism may be identified as discussed above. However, when making the determination as to whether to deploy the active safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Figure 11:
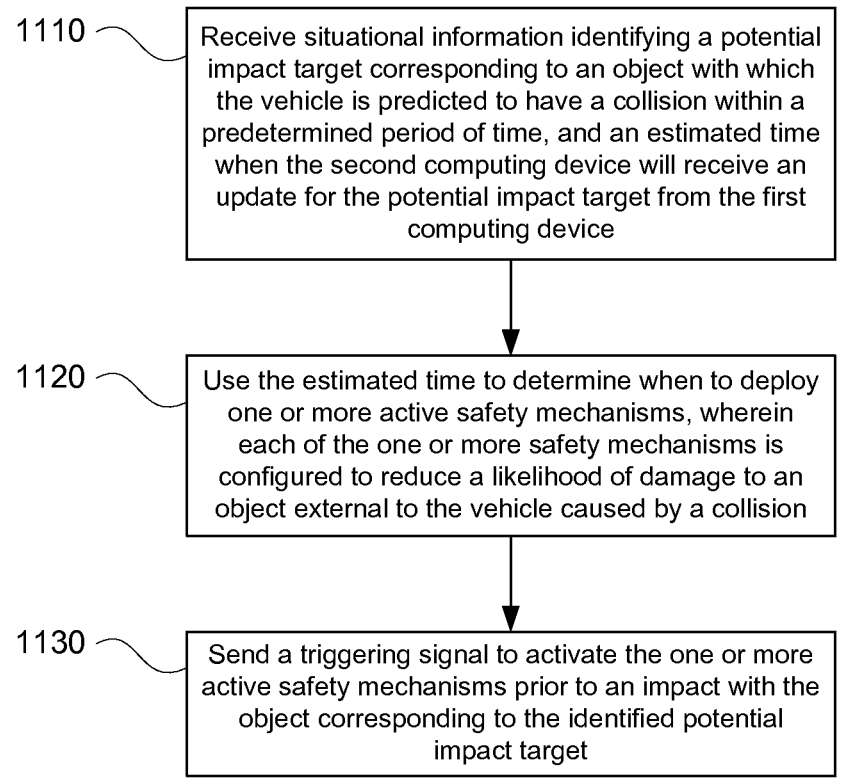
FIG. 11 is an example flow diagram in accordance with aspects of the disclosure.

FIG. 11 is an example flow diagram 1100 in accordance with some of the aspects described above that may be performed by one or more computing devices such as the one or more server computing devices 110. For example, at block 1110 situational information is received. This situational information identifies a potential impact target corresponding to an object with which the vehicle is predicted to have a collision within a predetermined period of time, and an estimated time when the second computing device will receive an update for the potential impact target from the first computing device. The estimated time is used to determine when to deploy one or more active safety mechanisms at block 1120. Each of the one or more safety mechanisms is configured to reduce a likelihood of damage to an object external to the vehicle caused by a collision. A triggering signal is sent to activate the one or more active safety mechanisms prior to an impact with the object corresponding to the identified potential impact target at block 1130.

Figure 12:
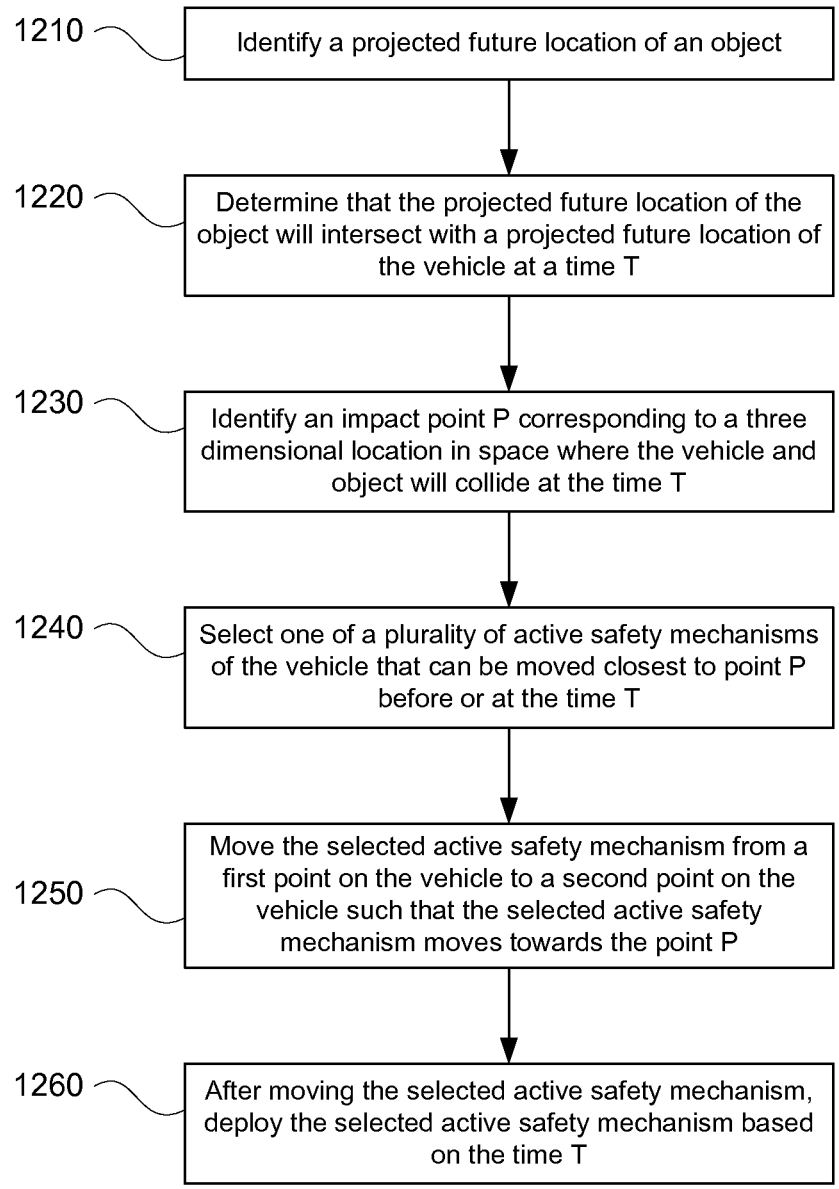
FIG. 12 is another example flow diagram in accordance with aspects of the disclosure.

FIG. 12 is an example flow diagram 1200 in accordance with some of the aspects described above that may be performed by one or more computing devices such as the one or more server computing devices 110. For example, at block 1210 a projected future location of an object is identified. At block 1220, it is determined that the projected future location of the object will intersect with a projected future location of the vehicle at a time T. An impact point P corresponding to a three dimensional location in space where the vehicle and object will collide at the time T is identified at block 1230. One of a plurality of active safety mechanisms of the vehicle that can be moved closest to point P before or at the time T is selected at block 1240. The selected active safety mechanism is moved from a first point on the vehicle to a second point on the vehicle such that the safety mechanism moves towards the point P at block 1250. After moving the selected active safety mechanism, the active safety mechanism is deployed based on the time T.

Figure 13:
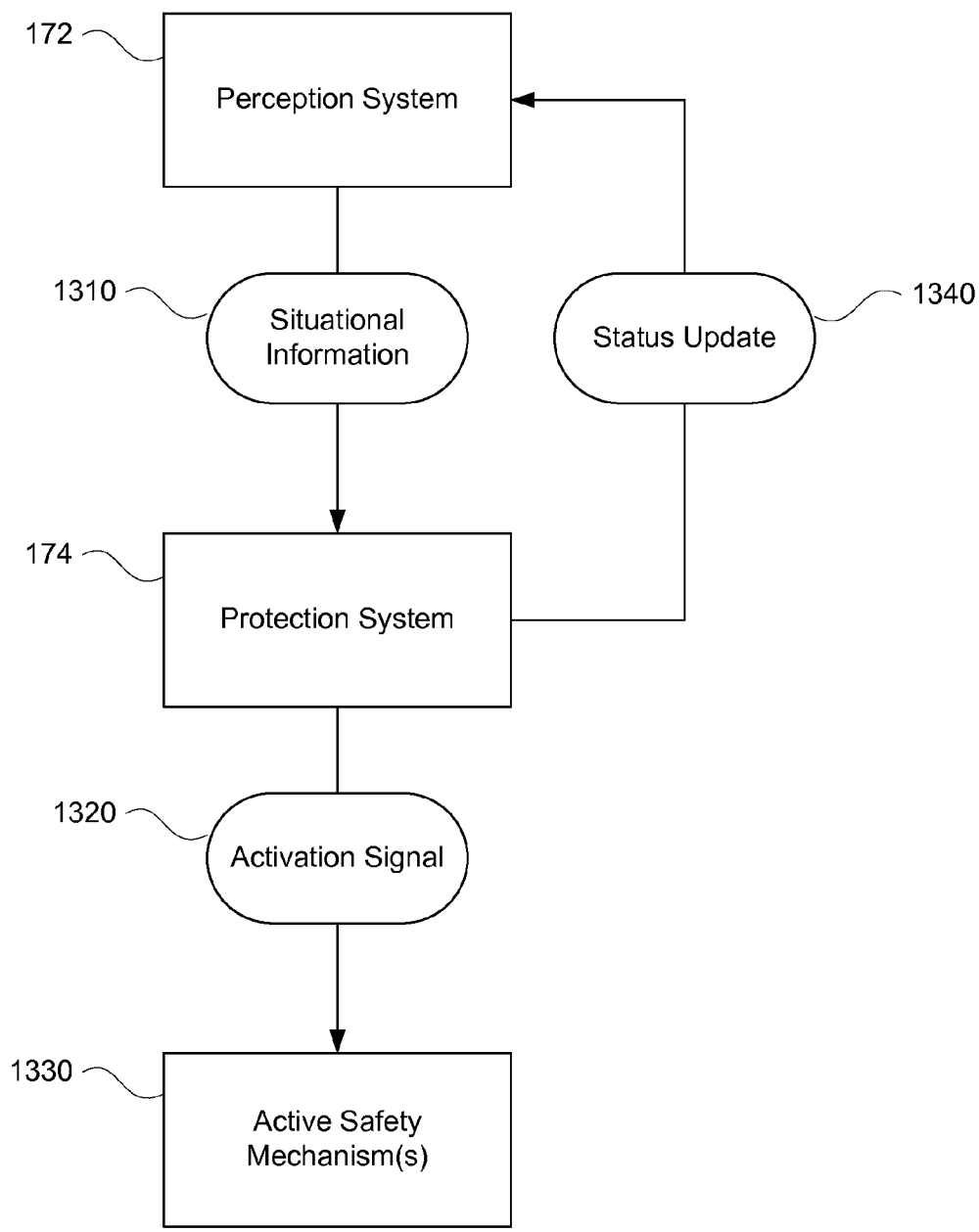
FIG. 13 is another example flow diagram in accordance with aspects of the disclosure.

FIG. 13 is an example flow diagram 1300 in accordance with some of the aspects described above related to the flow of information between the various systems of the vehicle as discussed above. In this example, when a collision with an object is imminent, the perception system 172 sends situational information 1310 to the vehicle's protection system 174. The vehicle's protection system 174 may then determine whether to wait for an update or to deploy one or more of the active safety mechanisms 1330. In this example, the active safety mechanisms may include all or some of the safety mechanisms 176. In order to deploy the one or more active safety mechanisms, the protection system 174 may send an activation signal 1320 to the active safety mechanisms 1330. As noted above, the protection system 174 may also send update information about the deployment of the one or more active safety mechanisms 1330, for example information indicating that activation signal 1320 has been sent back to the perception system 172 or other of the systems or computing devices of the autonomous vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of deploying safety mechanisms in a vehicle, the method comprising:

receiving, from one or more first computing devices having one or more processors by one or more second computing devices having one or more processors, situational information, the situational information identifying a potential impact target corresponding to an object with which the vehicle is predicted to have a collision within a predetermined period of time, and an estimated time when the second computing device will receive an update for the potential impact target from the first computing device;

using, by the one or more second computing devices, the estimated time to determine when to deploy one or more active safety mechanisms, wherein each of the one or more safety mechanisms is configured to reduce a likelihood of damage to an object external to the vehicle caused by a collision;

sending, by the one or more second computing devices, a triggering signal to activate the one or more active safety mechanisms prior to an impact with the object corresponding to the identified potential impact target, wherein the situational information includes information identifying an impact point where the vehicle and the object are predicted to have the collision, mapping the impact point to a point on an exterior of the vehicle;

selecting the one or more active safety mechanisms further based on the point on the exterior of the vehicle;

repositioning the selected one or more active safety mechanisms from a first location to a location closest to the impact point without the selected one or more active safety mechanisms being deployed; and deploying, by one or more actuators, the one or more active safety mechanisms when the impact is imminent, wherein the selected one or more active safety mechanisms is configured to be deployable at the first location as well as at the location closest to the impact point.

2. The method of claim 1, further comprising selecting the one or more active safety mechanisms from a set of active safety based on the situational information such that at least one of the active safety mechanisms of the set of active safety mechanisms is not included in the set.

3. The method of claim 1, wherein the situational information includes a dimension of the identified potential impact target and the one or more active safety mechanisms is selected further based on the dimension.

4. The method of claim 3, further comprising, using the dimension to classify a mass of the object, and wherein the one or more active safety mechanisms is selected further based on the classification.

5. The method of claim 1, wherein the situational information further includes information identifying a type of object for the identified potential impact target and the one or more active safety mechanisms is selected further based on the type of object.

6. The method of claim 1, wherein the one or more active safety mechanisms includes at least one primary active safety mechanism configured to reduce a likelihood of damage caused by a primary impact between a first object and the vehicle and at least one secondary active safety mechanism configured to reduce a likelihood of damage caused by a secondary impact between the first object and a second object after and as a result of the primary impact.

7. The method of claim 6, wherein sending the triggering signal causes at least a portion of the vehicle to move in a way that a primary impact with the object corresponding to the identified potential impact target by the vehicle will reduce a likelihood of damage caused by a secondary impact with the object corresponding to the identified potential impact target and another object.

8. The method of claim 7, further comprising sending, in response to the received situational information, a status update to the one or more first computing devices identifying a status of the triggering signal.

9. The method of claim 1, further comprising:
receiving, before receiving the situational information, second situational information identifying the potential impact target corresponding to the object with which the vehicle is predicted to have a collision within the predetermined period of time and a second estimated time when the second computing device will receive a second update for the potential impact target from the first computing device; and
determining, based on the estimated time, that the vehicle will wait for the second update before deploying the one or more active safety mechanisms.

10. The method of claim 9, wherein determining to wait for the second update is further based on a deployment time for the one or more active safety mechanisms.

11. A system comprising:
one or more active safety mechanism configured to reduce a likelihood of damage to an object external to a vehicle caused by a collision between the object and the vehicle;
one or more first computing devices having one or more first processors configured to:
receive, from one or more second computing devices having one or more second processors, situational information, the situational information identifying a potential impact target corresponding to an object with which the vehicle is predicted to have a collision within a predetermined period of time, and an estimated time when the second computing device will receive an update for the potential impact target from the first computing device;
use the estimated time to determine when to deploy the one or more active safety mechanisms;
send a triggering signal to activate the one or more active safety mechanisms prior to an impact with the object corresponding to the identified potential impact target;
wherein the situational information includes information identifying an impact point where the vehicle and the object are predicted to have the collision,
map the impact point to a point on an exterior of the vehicle;
select the one or more active safety mechanisms further based on the point on the exterior of the vehicle;
reposition the selected one or more active safety mechanisms from a first location to a location closest to the impact point without the selected one or more active safety mechanisms being deployed; and
deploy, by one or more actuators, the one or more active safety mechanisms when the impact is imminent,
wherein the selected one or more active safety mechanisms is configured to be deployable at the first location as well as at the location closest to the impact point.

12. The system of claim 11, wherein the one or more first processors are configured to select the one or more active safety mechanisms from a set of active safety based on the situational information such that at least one of the active safety mechanisms of the set of active safety mechanisms is not included in the set.

13. The system of claim 12, wherein the situational information includes a dimension of the identified potential impact target and the one or more first processors are further configured to select the one or more active safety mechanisms further based on the dimension.

14. The system of claim 13, wherein the one or more first processors are further configured to:
use the dimension to classify a mass of the object, and
select the one or more active safety mechanisms further based on the classification.

15. The system of claim 12, wherein the situational information further includes information identifying a type of object for the identified potential impact target and the one or more first processors are further configured to select the one or more active safety mechanisms further based on the type of object.

16. The system of claim 11, wherein the one or more active safety mechanisms includes at least one primary active safety mechanism configured to reduce a likelihood of damage caused by a primary impact between a first object and the vehicle and at least one secondary active safety mechanism configured to reduce a likelihood of damage caused by a secondary impact between the first object and a second object after and as a result of the primary impact.

17. The system of claim 11, the one or more first processors are further configured to:
receive, before receiving the situational information, second situational information identifying the potential impact target corresponding to the object with which the vehicle is predicted to have a collision within the predetermined period of time and a second estimated time when the second computing device will receive a second update for the potential impact target from the first computing device; and
determine, based on the estimated time, that the vehicle will wait for the second update before deploying the one or more active safety mechanisms.

18. The system of claim 17, wherein the one or more first processors are further configured to determine that the vehicle will wait for the second update further based on a deployment time for the one or more active safety mechanisms.

19. The method of claim 4, wherein the mass of the object is a center of mass of the object.

20. The system of claim 11, wherein the situational information includes using a center of mass of the object to classify the object.

* * * * *